United States Patent [19]

Marenin

[11] Patent Number: 5,859,986
[45] Date of Patent: Jan. 12, 1999

[54] BANDWIDTH EFFICIENT METHOD AND MEANS FOR RESYNCHRONIZING A MASTER AND SLAVE OVER A CLOCKED, ARBITRATED, BIDIRECTIONAL MULTISTATE PARALLEL BUS USING LOCAL DATA RECIRCULATION, WAIT STATES, AND CYCLE STEALING

[75] Inventor: George B. Marenin, San Jose, Calif.

[73] Assignee: International Business Machines Corporation, Armonk, N.Y.

[21] Appl. No.: 803,362

[22] Filed: Feb. 20, 1997

[51] Int. Cl.⁶ ...................................................... G06F 13/34
[52] U.S. Cl. ........................... 395/290; 395/552; 395/553
[58] Field of Search ............ 395/200.3, 200.38–200.41, 395/200.62–200.74, 200.78, 290, 293, 551, 552, 553, 855, 670–678, 728, 729

[56] References Cited

U.S. PATENT DOCUMENTS

| | | | |
|---|---|---|---|
| 3,883,855 | 5/1975 | Brightman et al. | 340/172.5 |
| 5,195,185 | 3/1993 | Marenin | 395/303 |
| 5,377,325 | 12/1994 | Chan | 395/551 |
| 5,467,295 | 11/1995 | Young et al. | 395/200.4 |
| 5,778,244 | 7/1998 | Putnins et al. | 395/800.11 |

*Primary Examiner*—Glenn A. Auve
*Assistant Examiner*—Xuan M. Thai
*Attorney, Agent, or Firm*—R. Bruce Brodie; Philip R. Wadsworth

[57] ABSTRACT

A method and means for efficiently utilizing bus bandwidth among processors and input/output devices burst coupled in master/slave pairs over a clocked, arbitrated, bidirectional, multistate, local communications bus. The method resynchronizes arbitrated masters and selected slaves perturbed during their bus-coupled transactions by recirculating data during a write operation at a bus master in the absence of a slave acceptance signal, or recirculating by a slave in the absence of a master response. The recirculating master or slave responsive to a delayed indication from its passive opposite then sends out the data over the bus at an integral multiple of the clock rate.

16 Claims, 7 Drawing Sheets

BANDWIDTH EFFICIENT METHOD AND MEANS FOR RESYNCHRONIZING A MASTER AND SLAVE OVER A CLOCKED, ARBITRATED, BIDIRECTIONAL MULTISTATE PARALLEL BUS USING LOCAL DATA RECIRCULATION, WAIT STATES, AND CYCLE STEALING

FIELD OF THE INVENTION

This invention relates to a method and means for efficiently utilizing bus bandwidth among processors and input/output devices burst coupled in master/slave pairs over a clocked, arbitrated, bidirectional, multistate, local communications bus. More particularly, the invention relates to resynchronizing arbitrated masters and selected slaves perturbed during their bus-coupled transactions without resorting to large local buffers or complex task-switched states or the like.

DESCRIPTION OF RELATED ART

Aspects of a Local Communications Bus

A bus is a parallel operation expressed as a bidirectional set of lines to which an unlimited number of stations (masters/slaves) are coupled. In contrast, a loop is a transmission path closed upon itself. Even though a bus is not closed, nevertheless it is a time-shared path so that distances, as measured in propagation time (delay) along the path, will determine the minimum cycle time.

A bus-based system comprises an unlimited number of bidirectional I/O units and one or more bidirectional microprocessors coupling the bus or path. Each processor or I/O unit can read or write such that control and data is moved bidirectionally over the bus. Such a bus-based system uses distributed control, especially distributed arbitration among contending bus masters and slaves. All of the units work in synchronism. Also, each unit is aware of the current bus owner's unit operation and priority classification of all the other units.

Arbitration, the Bus, and Cycles

Since the system is time shared, it means that one and only one piece of information may be propagating on the line at any instant of time. Some mechanism has to be provided for ascertaining which station will be the bus master and some mechanism for ascertaining the addressee or slaves. Ascertaining the bus master is termed "arbitration".

Arbitration is the process of determining which one of a plurality of masters will have exclusive access to the bus on the next cycle. Ordinarily, the determination is based on priority and fairness. This means that each processor and I/O unit would be assigned a priority and, where two or more masters are contending, the master having the highest priority wins. This could lead to some masters being locked out. Accordingly, arbitration will have some fairness rules built into it. One example might be that on every tenth request, access to the bus will be given to a master in the bottom 25 percent of the priority scale.

The arbitration process consumes some number of bus cycles. This reduces available bandwidth. In order to make arbitration transparent to the bus, the arbitration process must be performed extrinsically (in parallel).

Centralized arbitration is where one of the masters, such as a CPU, resolves contention among all masters. Ordinarily, the transfer is atomic, meaning that once it starts it is not interrupted until completed. Distributed arbitration can be designed to support a priority or other interrupt of a data transfer in process.

Driver Switching, Cycle Time, and Bus Burnout

A bus proper comprises arbitration lines, timing lines, and control lines, in addition to the data lines attaching each of the processors and I/O units. However, extrinsic logic and logic within the processors and I/O units operate the bus as a clocked, arbitrated, bidirectional (bidi), parallel data transfer medium. However, the timing lines are unidirectional. Each of the processors, I/O units, extrinsic logic and the like are expressed on semiconductor chips. The chips are coupled to the bus via device drivers. Because the bus cycle or clock times are approaching the switching times of the drivers, drivers physically cannot be switched "instantaneously". One problem not efficiently solved by the prior art is that of preventing two drivers from being attached to the bus at the same time. This would avoid bus overload and burnout.

Buses, Bursts, and Cycles

Where a bus-based system uses a significant number of chips interacting with the processor unit and the memory, bus communications among the chips require the use of bursts. Some of the bursts are short and some of the bursts are quite long. Relatedly, long bursts transmitted on a microchannel-like bus require coupling devices to the bus through large buffer/memories. In addition to the memory cost, there arises the cost of the control and sequencing of the memories. Extra cycles are also needed for chip crossings and for destination addressing that requires additional associated bus turnaround dead times. In many cases, this time increases latencies and usually reduces the bandwidth. To solve this and to provide synchronous packet data transfers, costly burst buffers with complex sequencing logic are repeated at each interface, making any high priority short transfers inefficient and the architecture nonreal-time. Also, for uninterrupted short bursts, such as to and from SDRAM's across modules, buffering and synchronization sequencing is done by separate elaborate controllers.

Other Imperious Masters and Lackadaisical Slaves

If a current transmission on a bus is interrupted by a master having a higher priority, then arbitration logic, if housed in a processor, can task switch out the arbitrated current master and then cause a higher priority master to be task switched in. Relatedly, task switching usually requires that the present control and information state of an arbitrated master and selected slave be preserved in a construct, such as a task control block or the like. While such task switching would avoid having to reinitialize the displaced master when its higher priority neighbor had completed its bus transaction, nevertheless the process and cycle time overhead in performing the operation twice is considerable.

It is to be appreciated that critical parameters in a system are determined around three different design points denominated best, nominal, and worst cases, respectively. As previously mentioned, the length of the bus determines its propagation delay or latency. Thus, a bus having a long length with multiple timing, control, and data paths relative to the cycle time it actually uses exhibits deskewing of coded pulses sent down the parallel paths as well as phase delay and jitter. The effects of propagation timing and delays also pervade the driving and receiving register logic and their associated drivers and receivers. It is also appreciated that the frequency inverse of the bus propagation delay or latency determines the bus bandwidth frequency best case. Conservative design practice dictates that the worst case is to be set three times slower, or that the bandwidth is three times that of the best case. The nominal case is set at a midpoint between the two.

When an arbitrated master or a selected slave performs at a design point close to the best case, there is a reasonable expectation of clock-induced error. Responsively, such systems might retry the whole transmission, correcting the error using coded information redundancy in the communicated data or the like. This clearly wastes bus cycles.

SUMMARY OF THE INVENTION

It is accordingly an object of this invention to devise a method and means for efficiently utilizing bus bandwidth among processors and input/output devices burst coupled in master/slave pairs over a clocked, arbitrated, bidirectional, multistate, local communications bus.

It is yet another object to devise a demand/response method and means to resynchronize arbitrated masters and selected slaves perturbed during their bus-coupled transactions without resorting to large local buffers or complex task-switched states or the like.

It is still another object to devise a method and means which would utilize flexibility and self-adjustment between an arbitrated master and a selected slave.

The above objects are believed satisfied by a method and means which is premised on the unexpected observation that resynchronization of a self-timed, anticipatory, pipelined, interlocked communications bus requires that bus timing signals have the same or slower speed on the bus than all other classes of bus signals including data, addressing, control, or arbitration. With that limitation, the method of the invention arbitrates among all bus-attached processors and I/O units and selects the processor or I/O unit presenting the highest priority as the current master. During a first clock cycle, the arbitrated master selects at least one slave by address and byte count notification sent over the bus data and control paths combined. Then, during a second clock cycle, the arbitrated master designates the direction of data transfer (read/write) to the addressed slave and transmits the data if the transfer is a write.

In the event that the selected slave requires more than one clock cycle to decode the address and process the function designated by step, then the slave delays sending an acceptance to the arbitrated master. Also, in the event that the transfer direction was from the master toward the slave, i.e., a write operation, the arbitrated master recirculates any data locally (off bus) starting at a predetermined intermediate point. The recirculation continues until either an acceptance signal is received from the slave, a time out, or the like occurs. Of course, upon receipt of an acceptance, the arbitrated master sends the data.

In the method and means of this invention, the selected slave paces data transfer in integral multiples of clock cycles. Also, the arbitrated master paces data transfer in integral multiples of clock cycles responsive to a master acceptance signal (data next line) from the slave.

In this invention, in the event that the bus is seized at any time by another master having higher priority than the arbitrated master, the higher priority master cycle steals from the arbitrated master and the arbitrated master assumes a wait state. When the higher priority transaction is concluded, the current transaction resumes without having to reinitiate or arbitrate its bus allocation/binding.

Where the clock frequency is set higher than the worst-case bandwidth and the arbitrated master does not receive acceptance signals from a selected slave during a write operation, then the master recirculates the data locally (off bus) and transmits the data to the slave at a predetermined integral number of clock cycles, such as at one-half the nominal clock rate. This devolves because the data received at the selected slave is time undecodable.

An additional benefit stemming from a tristate bus is that one of the three states is dedicated as a hold or wait state and provides for "dead time". This arises where the bus is being switched from one driver to another. Consequently, one driver can be turned off, after which the other can be turned on. This avoids the problem of bus burnout previously described.

DESCRIPTION OF THE PREFERRED EMBODIMENT

Bus-coupled Systems in General

Figure 1:
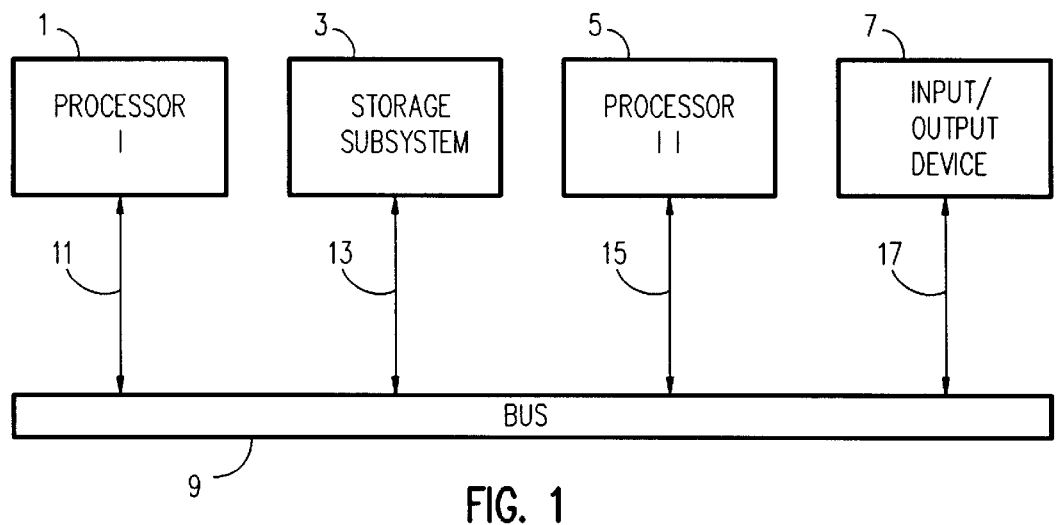
FIG. 1 shows a block diagram of a prior art parallel bus attaching diverse processors, subsystems, and devices.

Referring now to FIG. 1, there is shown a block diagram of a prior art parallel bus 9 attaching diverse processors 1 and 5, a subsystem 3, and an input/output device 7 over counterpart couplings 11, 13, 15, and 17. The bus 9 is an open parallel transmission path whose basic cycle time is determined by the driving and receiving registers, their associated drivers and receivers, the bus length, and the number of attached devices. The bus-based system further includes logic internal to each of the attached units and arbitration (not shown). Significantly, any of the processors 1 or 5, the subsystem 3, or device may request access to the bus 9 and ultimately to any of the other attached units as a destination. They are assigned a predetermined priority and the arbitration unit will determine which among the units presenting priority will be given access to the bus. The bus is preferably bidirectional, although such is not a requirement. Bidirectionality simplifies processing since any of the units may become an arbitrated master and one or more of the other units may become a selected slave, and the direction of data transfer varies as a function of whether the master requests a read or a write operation.

Figure 2A:
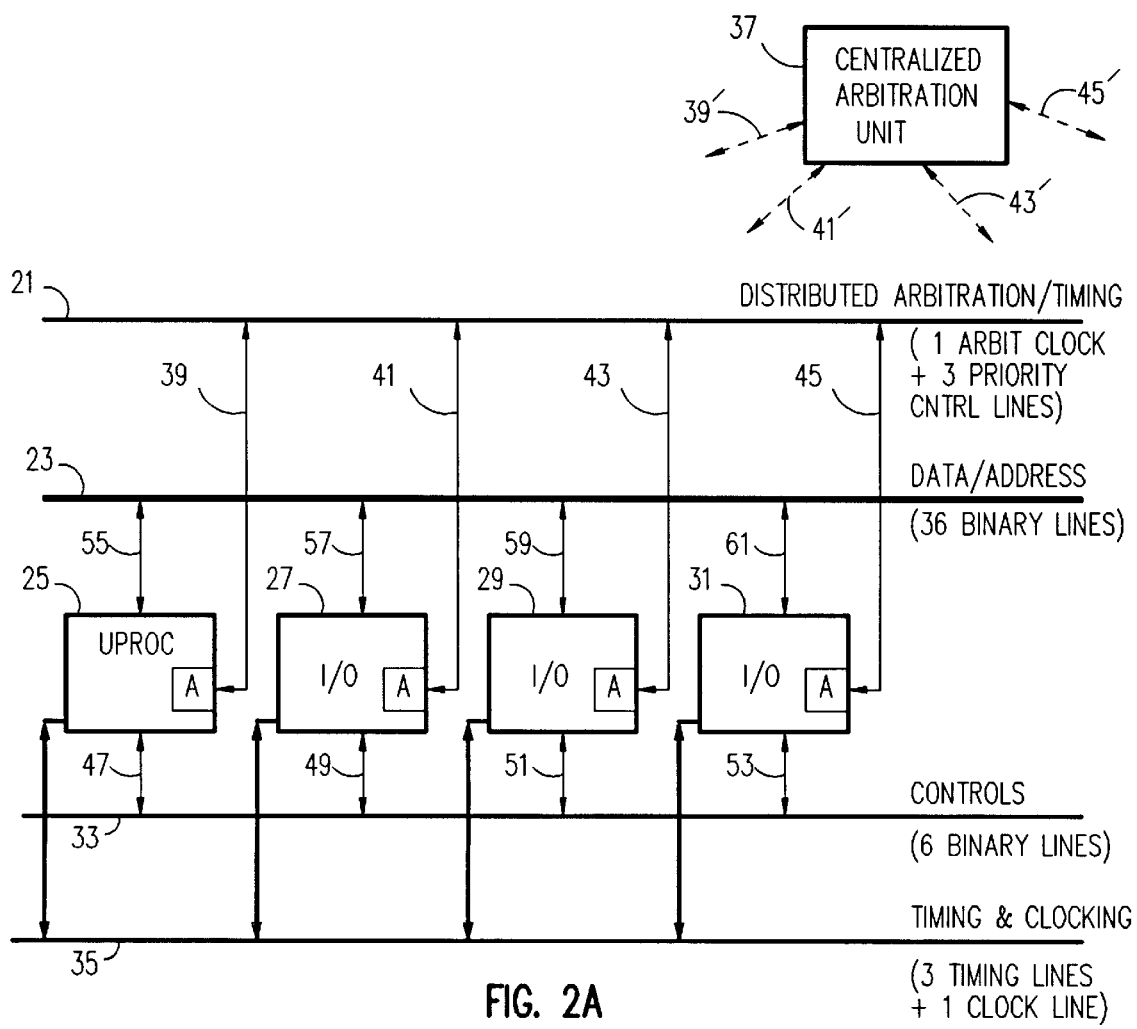
FIG. 2A depicts a contemporary clocked, arbitrated, multistate bus emphasizing distributed arbitration and various control, clocking, data, and other lines coupling each processor and unit.

Bus-coupled System with Arbitration, Data Address, Controls, and Timing/Clock Signals Referring now to FIG. 2A, there is shown a contemporary clocked, arbitrated, multistate bus. The bus itself comprises several different groups of lines or conductive paths actuable in parallel. These include distributed arbitration lines 21, control lines 33, clock and timing lines 35, and data and addressing lines 23. Each of these groups of lines couple each processor 25 and I/O units 27, 29, and 31. Arbitration among units presenting priority may be centralized, such as expressed in arbitration unit 37, with individual lines 39', 41', 43', or 49' coupling each of the processors 25 or I/O units. If the arbitration function is performed in a distributed manner, then the units requesting bus access determine which one will be granted that access. This can be done either in a daisy chain manner or by self-selection. That is, the method and means of this invention for the sharing of the total bus bandwidth on a real-time basis by any fairness algorithm can be modified as desired to suit specific applications. This concept is independent of the bus mastership mechanism used. As will be evident, it is compatible with distributed concurrent arbitration to select a new master-elect every two cycles. At this point, Marenin, U.S. Pat. No. 5,195,185, "Dynamic Bus Arbitration with Concurrent Same Bus Granting Every Cycle", issued Mar. 16, 1993, is hereby incorporated by reference.

For completeness, it should be appreciated that in daisy chain arbitration, the bus grant line 21 is run through units from lowest to highest priority. Here, the position along the bus determines priority. A high priority device that desires bus access intercepts the grant signal and does not allow a lower priority device to see the signal. This creates a fairness issue. However, in a distributed self-selection system, each unit desiring access places a code indicating its identity on the bus. By examining the bus, the units can determine the highest priority device that has made a request. There is no need for a central arbiter since each device determines independently whether it is the highest priority requestor.

Note, in FIG. 2A, each of the units 25, 27, 29, and 31 includes an arbitration circuit A coupled to the distributed arbitration path 21 over counterpart paths 39, 41, 43, and 45. Also, in the embodiment of the invention described herein, the bus comprises a bundle of 50 paths or lines, of which the arbitration line 21 consists of four binary paths, the data and address line 23 includes 36 binary paths, the control lines 33 comprise six binary paths, and the clock and timing lines 35 consist of four binary paths.

Figure 2B:
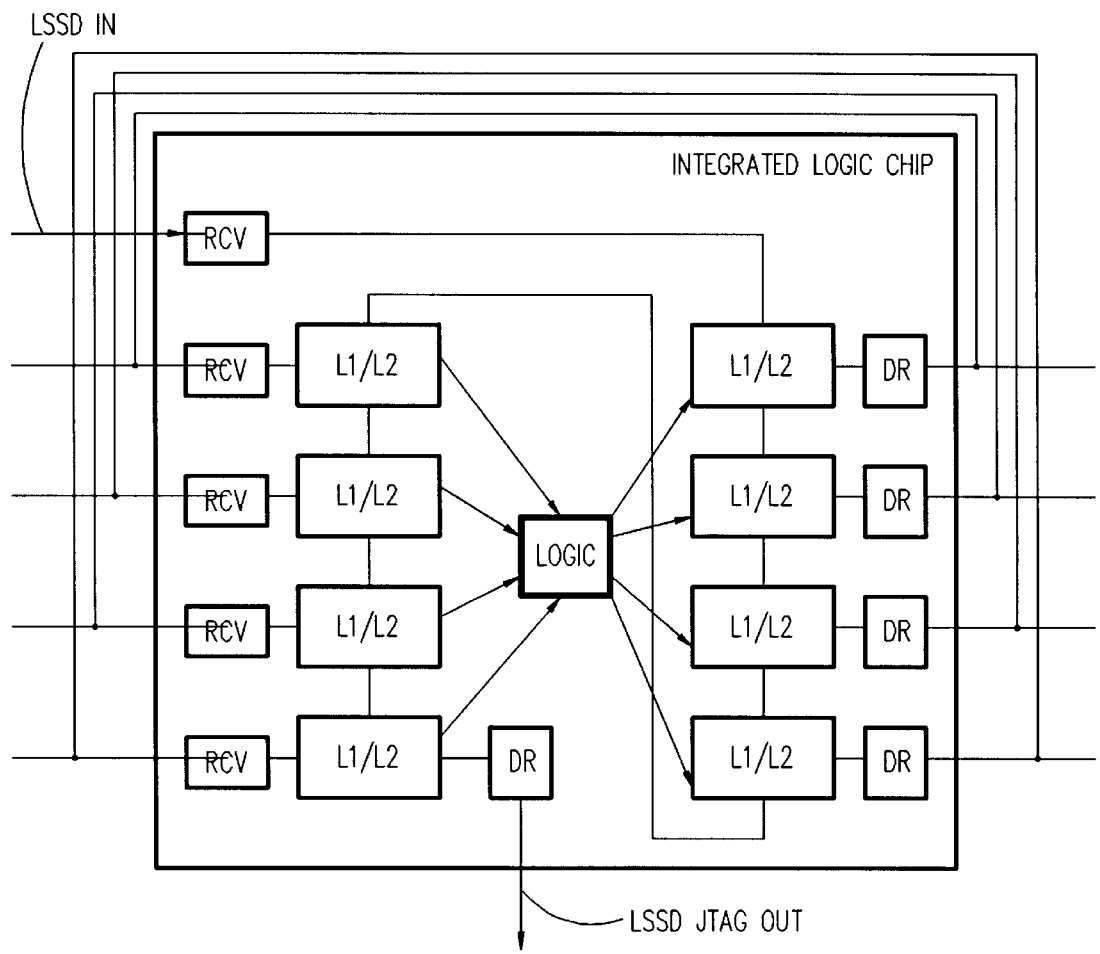
FIG. 2B illustrates a chip interface diagram having a JTAG register scanning interface well known in the prior art.

Referring now to FIG. 2B, there is shown a chip interface diagram depicting a JTAG register scanning interface. This is a standard interface at the chip level known in the prior art. It expresses register-to-register coupling without any intervening logic between drivers and receivers. It is of the type useful in the physical realization of the functions necessary to make and use the invention.

Bus-coupled System Embodying the Invention with Distributed Arbitration

Figure 3:
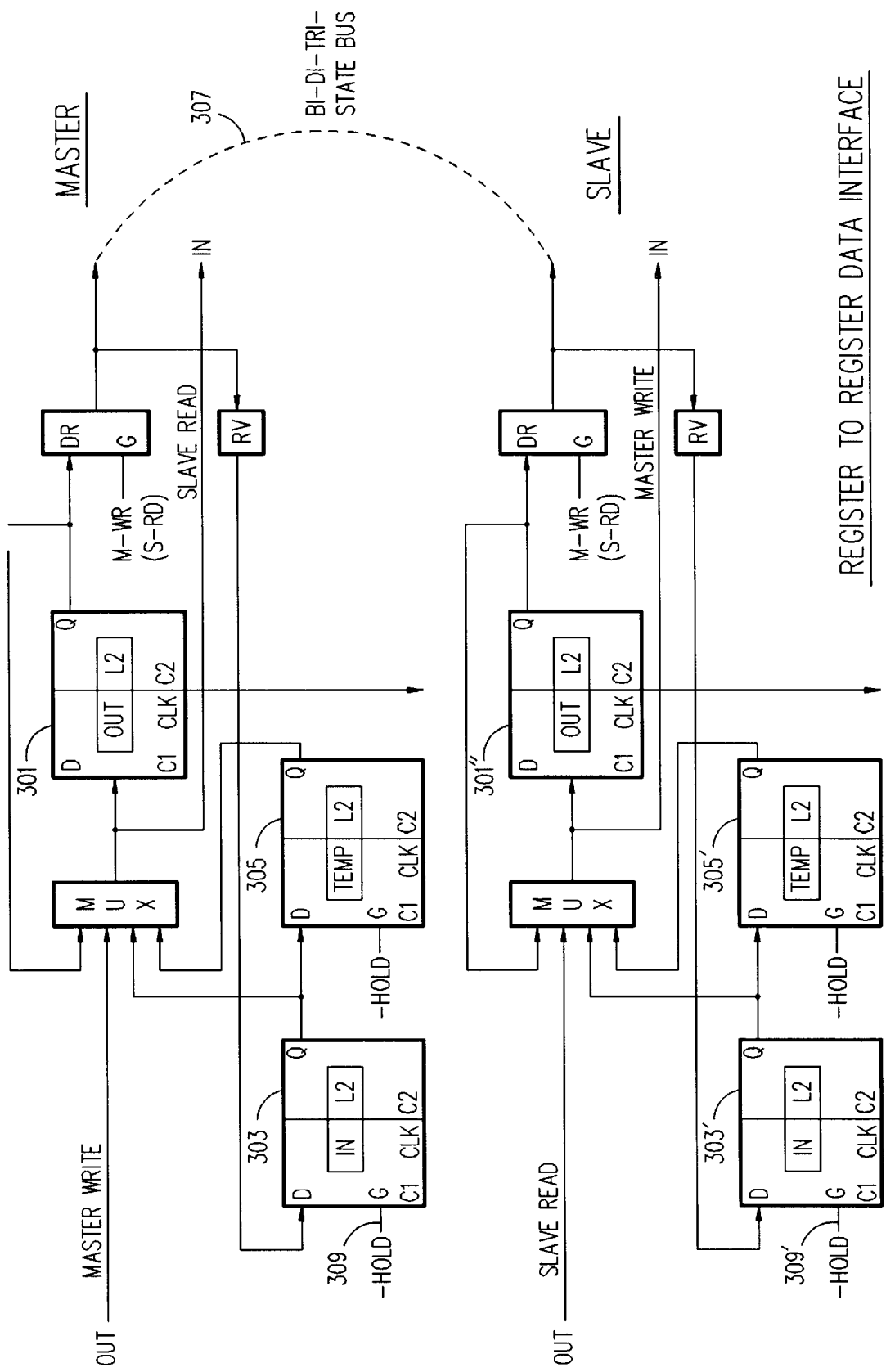
FIG. 3 sets out a logic level diagram of the bus system depicting data recirculation at a bus master as paced by a slave, according to the invention.
Figure 6A:
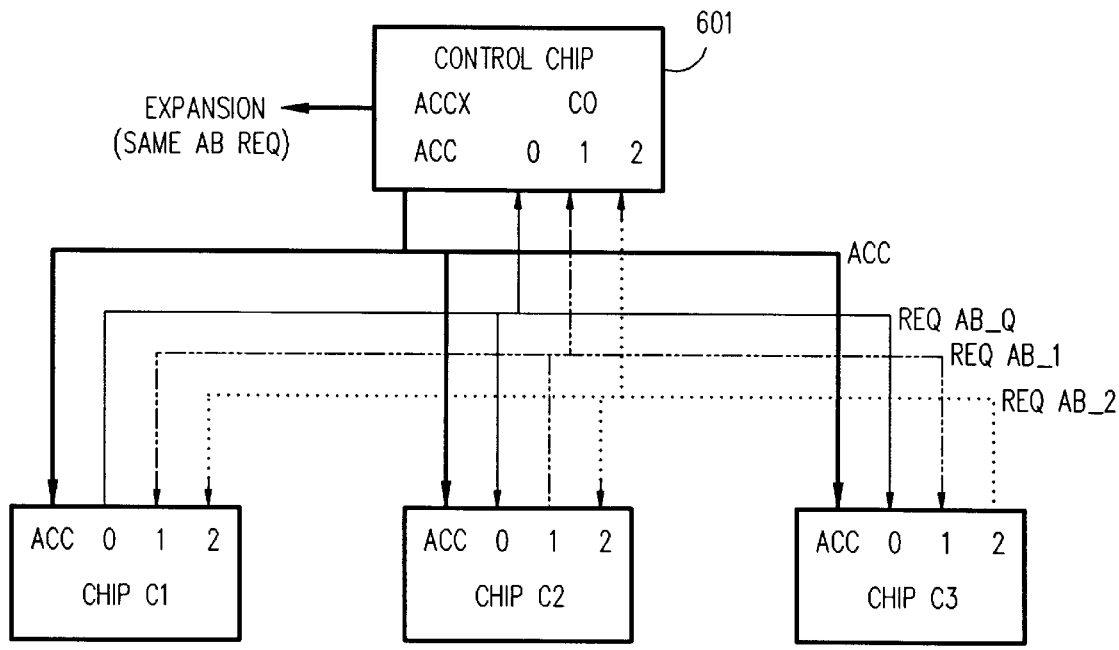
FIGS. 6A–6B set out a block diagram and timed responses of a distributed arbitration by self-selection arrangement to be used with the embodiment described in connection with FIGS. 3 and 5A–5B.
Figure 6B:
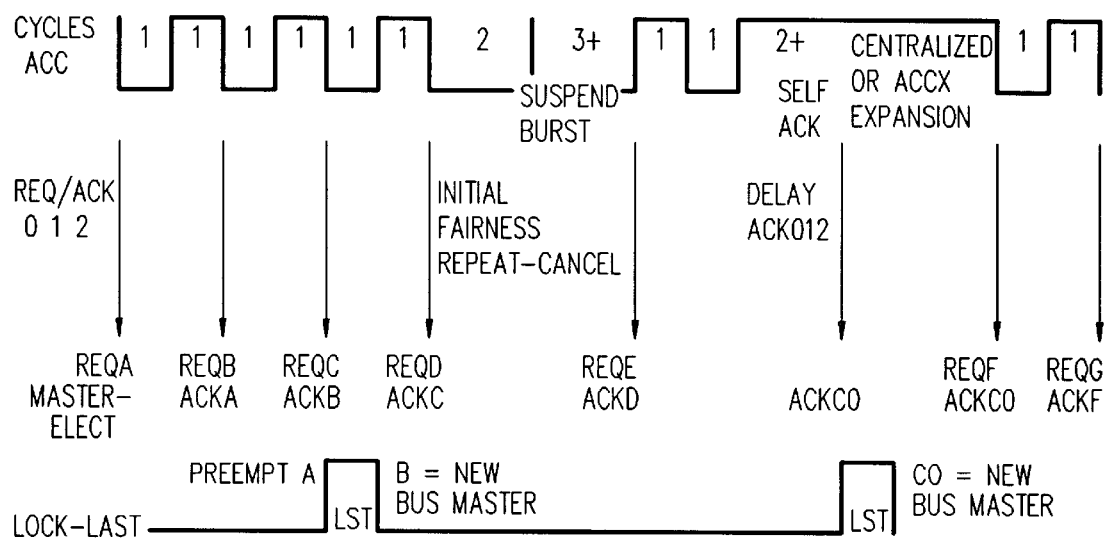

Referring now to FIGS. 3 and 6A–6B, the following signal definition lists the functions associated with the principal address, data, byte count, and control signals on the bus-based embodiment of the invention to be described in the subsequent paragraphs. The definitions are being introduced at this point in the text in aid of comprehension:

| Signal Acronym | Function |
| --- | --- |
| A/D | Address/Data bits 0–31 + Parity bits 0–3 (A/D_(0–29) = Address) |
| BC | Byte Count bits 5–6, multiplexed on D_(30–31) bits with ADV |
| CB | Control Bus 5+P bits (LCK, XPT, R/W, CB_(3), CB_(4)/Byte Count 0–4) |
| LCK | LoCKed by each Bus Master Acknowledgement except last data transfer |
| XPT | eXcepTion Slave LCBus errors (e.g., Busy-Reject, Bad Parity, etc.) |

-continued

| Signal Acronym | Function |
| --- | --- |
| R/W | −Read/+Write transfer direction (&-Read starts Slave) |
| CB | Control Bus bits 3–4 encoding for 4 subaddresses or XPT extensions |
| ADV | Address Valid (Present Address and Byte Count on A/D and CB buses |
| DAN | Data Next (Master/Slave WR/RD next cycle valid data pacing) |
| RSP | ReSPonse (Slave/Master WR/RD taken/paced, 16+ cycles = Cancel) |

Distributed Arbitration by Self-selection

Figure 4:
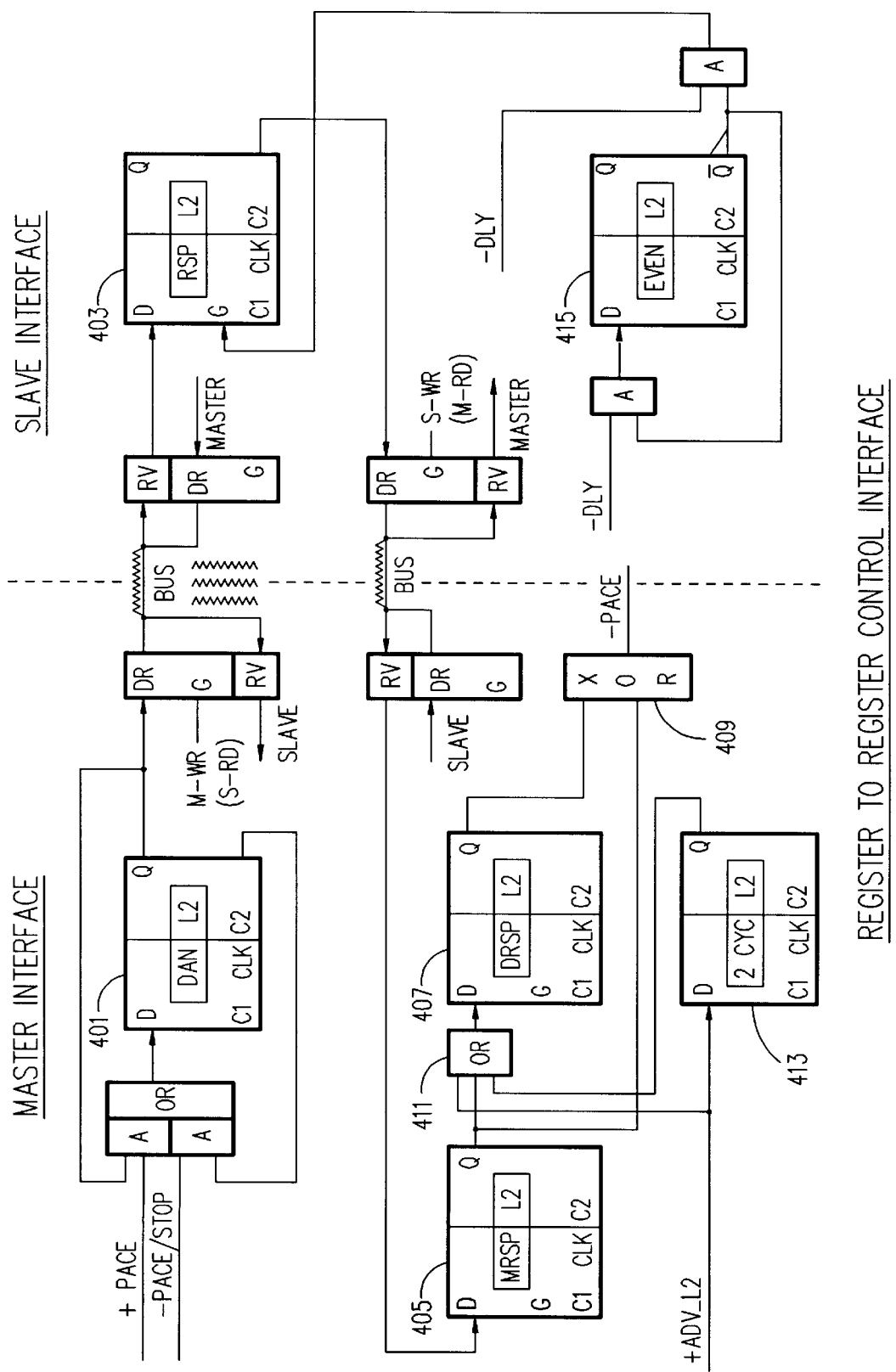
FIG. 4 illustrates self-timed synchronization controls for both recirculation and for data pacing purposes.

The invention as illustratively embodied in FIGS. 3 and 4 requires arbitration. While centralized or daisy chain arbitration might be operable, they each introduce undesired complications, performance penalties, and raise costs. It has been found that distributed arbitration by self-selection is a preferred choice.

Referring now to FIGS. 6A–6B, there is shown a block diagram and timed responses of a distributed arbitration by self-selection arrangement to be used with the embodiment described in connection with FIGS. 3 and 4. Referring first to FIG. 6A, there is shown a block diagram depicting four levels of arbitration that can also be reduced or expanded with or without encoding. Each arbitration level is a unidirectional totem pole line including a single highest priority level that is the Arbitration Control and Clock (ACC) immediate priority bus mastership override and the two-cycle synchronization timing signal. Every two cycles a new master-elect is determined and any such last master-elect (automatic preemption) becomes the next operating bus master when the current data burst ends as signaled by the release of the common tristate-driven lock (LCK) control signal. If there are no bus requests, the last bus master can reacquire the bus instantly at that time without arbitration.

At 100 MHZ, the four-byte bandwidth is 400 Mbytes/sec, not counting any turnaround tristate break or address cycles overhead. With this distributed arbitration, sequential transfers can skip the address cycles and the associated turnaround break cycles between bus masters and slaves by utilizing the arbitration bus AB signals (not shown) for indirect addressing of the bus transfers with the sliced data packets continuing from the last suspended addresses.

The data bus transfers execute in parallel with the arbitration that designates bus master-elects in a lookahead manner and, independent of the address/data transfers, arbitration communication and computation is performed at bus data transfer speeds. Since this high performance architecture depends on a single bus and one-direction propagation of all signals between the I/O devices, then during the odd arbitration cycles all the bus requests are propagated from and to every I/O device. During the even arbitration cycles, the priorities are computed and at the same time granted on the clock ending at even cycles at each I/O device in parallel.

The last master-elect or the highest priority (ACC driven plus for two or more cycles) arbitration level takes over the mastership of the bus (or expands arbitration to another ACCx on the same AB bus while ACC is plus) from the previous bus owner. This signals its own completion by driving the LCK signal off for its last data transfer period, including any pacing. Every bus master owner can perform as many transfers to different slaves as it desires and with any burst lengths programmed (priority arbitration). This multitransfer priority mode of operation is indicated by continuing to arbitrate for at least one more two-cycle arbitration period. This pertains once having started an active bus mastership transfer operation.

The current bus master controls the reading from slaves or the writing to slaves by the –Read/Write (–R/W) signal (minus for read and plus for write). However, only the last addressed slave on that particular arbitration priority level will be recognized, if address cycles are optionally skipped and other bus masters intervene.

The arbitration algorithm for four levels has a combination of priority and round-robin fairness. At any time, the highest priority level bus master can override any masterelect to become the next bus master. However, it honors any or all the other priorities that are in a request mode to be serviced at least once before self-honoring its own priority. Otherwise, any currently computed highest priority level of the remaining levels will be acknowledged. Subsequently, it will not be acknowledged until all the currently requesting levels have been acknowledged at least once. This occurs before the higher priority levels are acknowledged for the second time.

All arbitration bus master requests (four used in this example) are wired fixed while the fairness logic dynamically computes their instant priorities. This permits the distributed arbitration interfaces to be expanded or optionally connected to themselves or to a centralized arbiter. The fairness algorithm recomputes each time a new bus master takes control of the bus. The ACC line synchronizes the two-cycle arbitration periods that can be extended by a central control point, such as control chip 601 in FIG. 6A, to replace any bus master-elects as the highest priority bus master.

Resychronizing a Master and Slave Over a Clocked, Arbitrated, Bidirectional, Multistate Parallel Bus Using Local Data Recirculation, Wait States, and Cycle Stealing Referring now to FIG. 3, there is shown a logic level diagram of the bus system depicting data recirculation at a bus master as paced by a slave, according to the invention. In FIG. 3, each master or slave includes a set of three data registers 301, 303, and 305. In order to designate their function, the registers are also denominated as follows: register 301 is called AOUT-L2@, register 303 is named AIN-L2@, and register 305 is labeled ATEMP-L2@. Note that the counterpart data registers from the slave unit are respectively 301', 303', and 305'.

Register 303 continuously clocks the address or data received from the local communications bus 307, except when it is necessary to preserve the data information by a hold guard signal awaiting internal delays. Parenthetically, bus 307 is operated as a bidirectional tristate bus.

Register 305 always copies the information state of register 303, unless it is also preserved by the same previously-mentioned hold guard signal. Lastly, register 301 recirculates the address until data transfer starts or data is transmitted onto bus 307. During clock cycles when either the arbitrated master or the selected slave reads, the previous data is always preserved in register 303. This data can be interchanged with register 301 in the event that it is necessary to retransmit any of the last two missed or paced cycles of data.

Referring now to FIG. 4, there is shown a logic diagram depicting self-timed synchronization controls for both recirculation and for data pacing purposes. In this figure, register 401 (DAN-L2) continuously toggles the signal that can be delayed for master data pacing. This interlock signal is being received directly into register 403 located at the slave for generating a one-cycle, delayed-response (RSP) interlock signal. This interlock signal is returned to the originator (master) two cycles later and written into register 405 (MRSP-L2). Register 407 provides the delayed RSP signal as a copy of the contents of register 405 as delayed by another cycle. Next, XOR gate 409 will provide indications of any breaks in continuous data bursts should registers 405 and 407 contain the same values. Relatedly, OR gate 411, joining registers 405 and 413, forces an initial three-cycle delay to fill an anticipation pipeline before any data pacing can be deemed valid. The responder uses register 415 (EVEN-L2) to guarantee that any timing feedback will only pace in an even number of cycles. This facilitates the double interchange of transmitting data with registers 301 and 303 by the data burst originator, and also to resynchronize with the continuously changing DAN timing interlock signal.

Figure 5A:
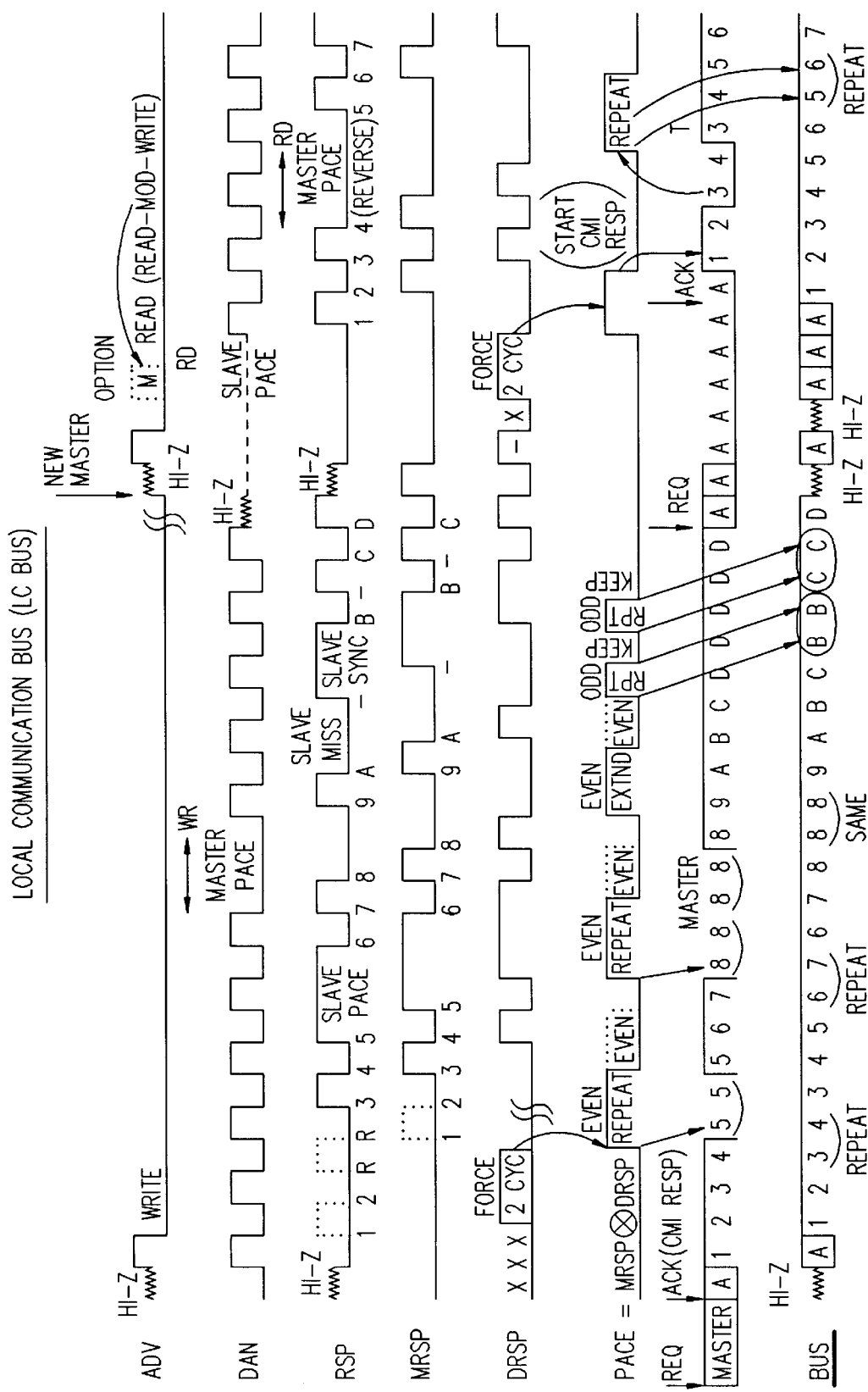
FIGS. 5A–5B show a timing diagram for bus arbitration, master/slave self-synchronizing and pacing, etc.
Figure 5B:
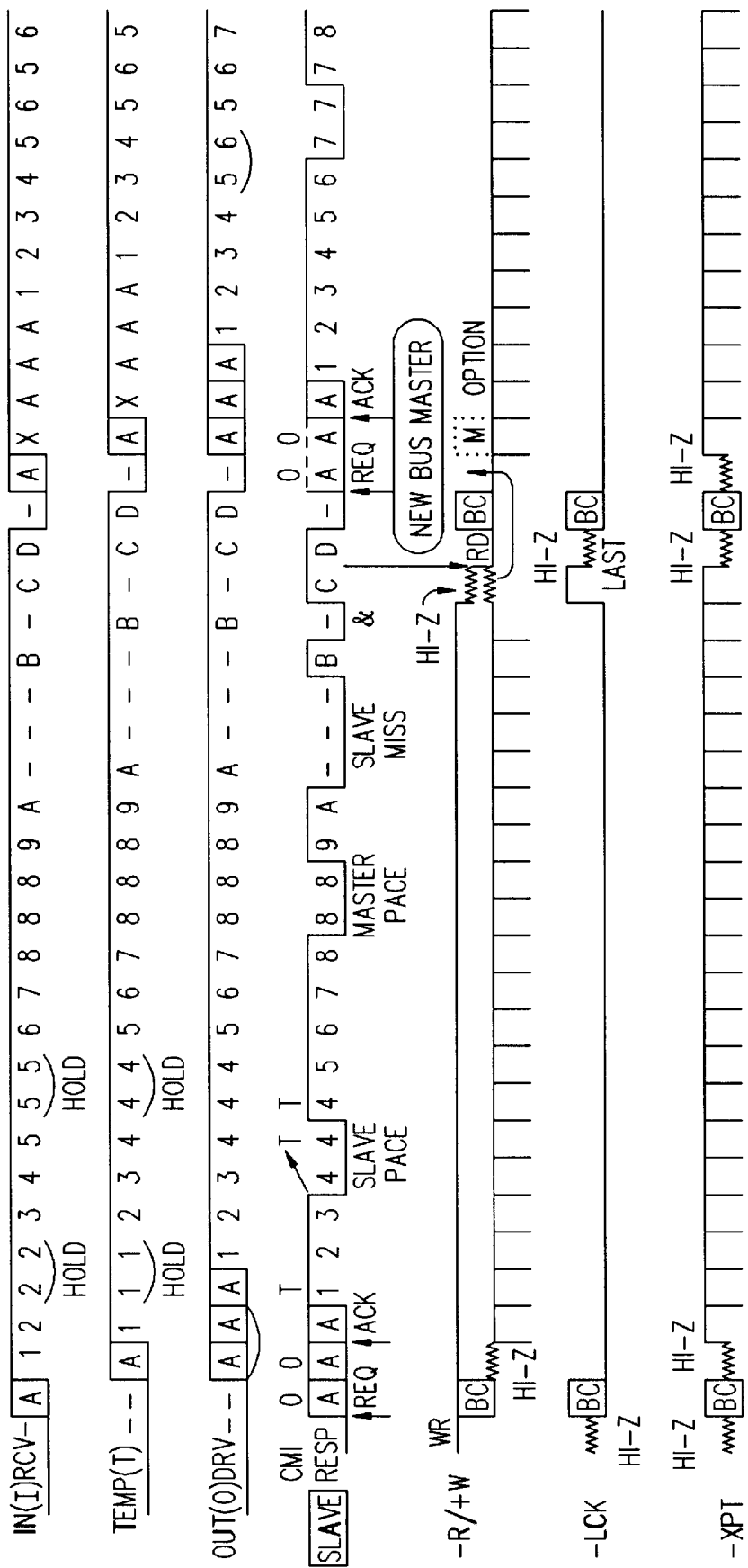

Referring now to FIGS. 5A–5B, there is shown a timing chart depicting address synchronization of slave and master data pacing on master writes. This is followed by address synchronization and reverse master data pacing on master reads for this self-timed, latency-delayed, data recirculating and resynchronizing anticipation pipeline. Relatedly, bus 307 is a bidirectional four-byte or other sized multiplexed address and data bus. It is driven by any master winning the arbitration to transfer data to or from any addressed slave. The interface comprises 45 bidirectional three-state signals. Of these 45 different signals, 36 signals include address and data with parity, six signals for the control and byte count, two signals for the source and destination handshake interlocks, and one signal indicates the multiplexing of address and byte count on the address data and control buses as opposed to data and controls. The lock (LCK) signal synchronizes all bus masters with the continuous arbitration. Since the LCK signal is a tristate path, it must be driven OFF (high) by the current arbitrated bus master for the last data transfer, and then driven by a high impedance source for the next cycle in order to permit a bus turnaround break cycle for the next bus master to take over control of the bus. A default bus master must also be designated to drive the LCK line during power-on reset until a new bus master wins the arbitration to own bus 307 and to take over from the previous bus master the responsibility for the LCK interlock signal. This avoids misreading this signal as high or low if it remains in the high impedance.

Referring now to FIGS. 3 and 5A–5B, it is apparent that transfers executed on bus 307 occur in parallel with the arbitration function. The arbitration function designates the bus master-elect in a lookahead manner and independent of address/data transfers. Since this high performance architecture depends on a single and a unidirectional propagation between masters and slaves, a data next (DAN) control signal is always toggled by the data sender at least one cycle ahead prior to the data receiver interlocking it with a return response (RSP) signal on any of the following cycles. This response pacing feature can be automatically used to dynamically extend occasional cycles at random in increments of one to guarantee data integrity with cycles set at below worst-case timings in order to operate at a higher bandwidth.

For read operations, the read/write (R/W) control, when it transitions from positive to negative, informs the addressed slave to start the read transfers. Such transfers are initiated by the slave sending the DAN interlock one cycle ahead of placing the data on bus 307, except for the first data transfer, in order to save time. Every time the bus master captures this data, it signals by toggling the RSP interlock so that the slave knows when to place the next data on bus 307 with data pacing in reverse by the active bus master to the slave. Read operations without a specified byte count (open) are greater than four bytes, and masters signal the endings to their slaves one cycle before the last read by ending the read indication with the R/W line going positive. Read-modify-writes can be performed by issuing a second ADV control signal one cycle after the first ADV control signal or after the second cycle otherwise and without placing any new addresses, but merely by changing the R/W from a read operation to a write operation.

With optional distributed arbitration, sequential transfers can skip the address cycles and the associated turnaround break cycles between bus masters and slaves by utilizing the arbitration bus (21) request signals for indirect addressing of the bus transfers.

The address valid (ADV) control signal indicates that a slave address is present on the address/data (A/D) lines 0–29, with the byte count also being sent to the slave on the CB 0–4 and the A/D 30–31 lines. The data next (DAN) control signal can also be present on the same cycle, together with the ADV pulse, to signal one cycle ahead. This indicates that the next cycle is to be a data transfer, for example, a write cycle. If no response signal (RSP) for writes or no data next (DAN) signal for reads is received by the bus master from the addressed slave in 16 cycles, then the slave does not exist or it did not recognize its own address.

If the cycles are set at below worst-case timing, then the bus master repeats the slave addressing period for two consecutive cycles. If still no RSP or no DAN signal is received in 16 cycles, then the desired slave is not there and the transfer has to be canceled. The address cycle can be skipped if the data transfer continues in address sequence by the same bus master. This can be accomplished by just issuing the DAN pulse for writes or the R/W (negative) control for reads without any ADV pulse. In this case, the transfer will continue from the last address completed. The exception (XPT) error signal indicates an error condition if it is sent by the slave, together with the RSP interlock (for master writes). It also indicates an error condition for the DAN timing toggle pulse (for master reads). Lastly, the XPT signal indicates a busy condition if it is received by the bus master without any RSP or DAN feedback signals.

The following is a brief function description of the steps of the method of the invention in terms of the master and slave logic shown in FIGS. 3 and 4 and the timing chart set out in FIGS. 5A–5B.

All operations are initiated by a master raising the Address Valid line (ADV). If data is to follow from the master indicative of a write operation, then the master will concurrently raise the DAta Next (DAN) line. This means that the data will immediately follow on bus 307 of FIG. 3 during the next cycle; the first cycle is always the address cycle. The master waits for the slave to respond on the RSP line. If there is no reply, the master will try by reapplying the address and waiting again over a predetermined pattern of trials. There is a built point where the master, failing to receive a signal on the RSP line, will conclude the slave device at that address does not exist. Parenthetically, when the ADV is on, all the devices know that the data bus contains the address and the control lines contain the byte count. In the absence of an address on the data lines, then bits on the data lines are treated as "data", while the bits on the control lines are treated as operational control functions such as lock line, exception line. It follows that the selected slave may require one or more cycles to respond to the master. Thus, when a master intends to write to a slave, it initiates the operation by sending an address, followed by no more than four data elements during the next cycle. When a response is finally received, it sends the remaining part of the data.

Referring again to FIGS. 5A–5B, there is illustrated the variable length repeat cycles of different bus commands as the response varies. Usually, the wait time between each cycle increases by a power of two until a maximum is reached. This maximum is termed a timeout. This may indicate a failure of a selected slave as a device, or it may indicate that the remote unit did not recognize its address because the clocks were running too fast.

In FIGS. 5A–5B, the master initiates the operation by raising the ADV line. It is awaiting a response for over four cycles. If the master is writing, it will only send four cycles of data. After the fourth cycle, the master is already accessing the fifth. Significantly, FIGS. 5A–5B only illustrate the situation of device latency. That is, the device has received the address and data from the master but is taking a variable amount of time to reply. This may be due to positioning an HDA and/or disk rotational delay, or both. If the device does not respond, then the master will send the address again and transmit the data at a slower rate derived by locally recirculating the data.

These and other extensions of the invention may be made without departing from the spirit and scope thereof as recited in the appended claims.

What is claimed is:

1. A method and means for efficiently utilizing bus bandwidth among processors and input/output devices burst coupled in at least master/slave pairs over a clocked, arbitrated, bidirectional, multistate, local communications bus, comprising the steps of:

(a) arbitrating among all bus-attached processors and I/O units and selecting the processor or I/O unit presenting the highest priority;

(b) causing the arbitrated master to access at least one slave by address and byte count notification over the bus; and (c) resynchronizing an arbitrated master and at least one selected slave perturbed during their bus-coupled transactions by (1) causing the arbitrated master to assume a wait state and locally recirculate data during a write operation in the absence of a slave acceptance signal or mutually exclusively causing the selected slave to locally recirculate data in the absence of a master response; and (2) causing the recirculating master or slave to send the data over the bus at an integral multiple of the clock rate responsive to a delayed indication from its respective paired slave or master.

2. A method for transferring data from at least one processor or input/output (I/O) unit to at least one other processor or I/O unit over a clocked, arbitrated, bidirectional, multistate (tristate) parallel bus, said bus including data, control, and timing signal paths, each processor or I/O unit being adapted to assume a master or slave data transmission role, arbitration determining a master among the processors and I/O units by priority at any given period of time, comprising the steps of:

(a) arbitrating among all bus-attached processors and I/O units and selecting the processor or I/O unit presenting the highest priority;

(b) during a first clock cycle, accessing at least one slave by address and byte count notification over the data and control paths combined as sent from the arbitrated master;

(c) during a second clock cycle, designating the direction of data transfer by the arbitrated master to the addressed slave and transmitting a data timing indication and at least some of the data if the transfer direction is master toward slave;

(d) in the event that the slave requires more than one clock cycle to decode the address and process the function designated by step (c), delaying any acceptance by the slave to the master;

(e) in the event that the transfer direction was from the master toward the slave, recirculating any data locally (off bus) by the master starting at a predetermined intermediate point until either an acceptance signal is received from the slave or a time out occurs; and (f) upon receipt of an acceptance from the slave, causing the master to send the remaining data to the slave.

3. The method according to claim 2, wherein said method further comprises the step of pacing the data transfer by the slave in integral multiples of clock cycles.

4. The method according to claim 2, wherein the said method further comprises the step of pacing the data transfer by the master in integral multiples of clock cycles responsive to a master acceptance signal from the slave.

5. The method according to claim 2, wherein the method further comprises the steps of seizing the bus at any time by another master having higher priority than the arbitrated master, said seizure including the steps of cycle stealing from the arbitrated master by said higher priority master, and assuming a wait state by said arbitrated master.

6. The method according to claim 2, wherein the bus manifests a worst-case frequency bandwidth significantly larger than a best-case frequency bandwidth, and further wherein the direction of transmission is from master to slave, and further in the event that the clock frequency is set higher than the worst-case bandwidth and the arbitrated master does not receive acceptance signals from the slave, the method further comprises the steps of recirculating the data locally (off bus) and transmitting the data at a predetermined integral number of clock cycles.

7. The method according to claim 6, wherein said data received at said slave is time undecodable, and further wherein said data being transmitted from master to slave is being transmitted at a predetermined integral number of clock cycles equal to one-half the nominal clock rate.

8. A method for transferring data from at least one processor or input/output (I/O) unit to at least one other processor or I/O unit over a clocked, arbitrated, bidirectional, multistate (tristate) parallel bus, said bus including data, control, and timing signal paths, each processor or I/O unit being adapted to assume a master or slave data transmission role and to be at least partially ordered on the basis of an assigned priority, arbitration determining a master among the processors and I/O units by priority at any given period of time, any arbitrated master initiating data transfers to one or more slaves designated by address and data string length (byte count), interactions between masters and slaves being of the demand/response (acceptance signal) type, said bus always being susceptible to seizure by a master of higher priority, comprising the steps of:

(a) arbitrating among all bus-attached processors and I/O units and selecting the processor or I/O unit presenting the highest priority;

(b) during a first clock cycle, accessing at least one slave by address and byte count notification over the data and control paths combined from the arbitrated master;

(c) during a second clock cycle, designating the direction of data transfer by the arbitrated master to the addressed slave and transmitting at least some of the data if the transfer direction is master toward slave;

(d) in the event that the slave requires more than one clock cycle to decode the address and process the function designated by step (c), delaying any acceptance by the slave to the master;

(e) in the event that the transfer direction was from the master toward the slave and the arbitrated master does not receive acceptance signals from the slave, recirculating any data locally (off bus) by the master, starting at a predetermined intermediate point in time, until either an acceptance signal is received from the slave or a time out occurs; and (f) upon receipt of an acceptance signal from the slave, sending the remaining data by the master at a predetermined integral number of clock cycles.

9. The method according to claim 8, wherein the method further comprises the steps of seizing the bus at any time by another master having higher priority than the arbitrated master, said seizure including the steps of cycle stealing from the arbitrated master by said higher priority master, and assuming a wait state by said arbitrated master until the higher priority master relinquishes the bus.

10. The method according to claim 8, wherein the bus manifests a worst-case frequency bandwidth significantly larger than a best-case frequency bandwidth and the direction of transmission is from master to slave, and further wherein said data received at said slave is time undecodable, and further wherein said data being transmitted from master to slave at one-half the nominal clock rate.

11. A method for transferring data from at least one processor or input/output (I/O) unit to at least one other processor or I/O unit over a clocked, arbitrated, bidirectional, multistate (tristate) parallel bus, said bus including data, control, and timing signal paths, each processor or I/O unit being adapted to assume a master or slave data transmission role, arbitration determining a master among the processors and I/O units by priority at any given period of time, comprising the steps of:

(a) arbitrating among all bus-attached processors and I/O units and selecting the processor or I/O unit presenting the highest priority;

(b) during a first clock cycle, accessing at least one slave by address and byte count notification over the data and control paths combined as sent from the arbitrated master;

(c) during a second clock cycle, designating the direction of data transfer by the arbitrated master to the addressed slave and if the transfer direction is slave toward master, causing the master to assume a wait state pending arrival of an acceptance indication from the slave with at least some of the data;

(d) in the event that the slave requires more than one clock cycle to decode the address and process the function designated by step (c), delaying communication of any acceptance indication by the slave to the master;

(e) since the transfer direction was from the slave toward the master, recirculating any data locally (off bus) by the slave starting at a predetermined intermediate point until either a response signal is received from the master or a time out occurs; and (f) responsive to a data timing indication from the slave, causing the slave to remit the remaining data together with data timing signals to the master.

12. In a data transmission system comprising a plurality of processors and input/output units coupled over a clocked, arbitrated, bidirectional, multistate bus, said bus including data, control, and timing signal paths, each processor or I/O unit being adapted to assume a master or slave data transmission role, arbitration determining a master among the processors and I/O units by priority at any given period of time, wherein the improvement comprises in combination:

(a) means for arbitrating among all bus-attached processors and I/O units and for selecting the processor or I/O unit presenting the highest priority;

(b) an arbitrated master including (1) means responsive during a first clock cycle for accessing at least one slave by address and byte count notification over the data and control paths combined;

(2) means responsive during a second clock cycle for designating the direction of data transfer between the arbitrated master and the addressed slave and for transmitting at least some of the data if the transfer direction is that of the master toward the addressed slave; and (3) means responsive to any absence of an acceptance by the slave for recirculating the data locally (off bus) and for transmitting the remaining data to the slave over the bus at a predetermined integral number of clock cycles; and (c) means for seizing the bus at any time by another master presenting a priority higher than the arbitrated master, said means including means for cycle stealing from the arbitrated master by said higher priority master, and for causing said arbitrated master to assume a wait state until the higher priority master relinquishes the bus.

13. In a data transmission system according to claim 12, wherein said means for transmitting the data to the slave transmits the same at a predetermined integral number of clock cycles equal to one-half the nominal clock rate.

14. In a data transmission system according to claim 12, wherein said selected slave includes means for pacing the data transfer in integral multiples of clock cycles.

15. In a data transmission system according to claim 12, wherein said arbitrated master further includes means responsive to an acceptance signal from said selected slave for pacing the data transfer master in integral multiples of clock cycles.

16. In a data transmission system according to claim 12, wherein the means for arbitrating among all bus-attached processors and I/O units selectively includes one means from a set of means consisting of a centralized parallel arbitration, daisy chain arbitration, and distributed arbitration by self-selection.

* * * * *